United States Patent Office

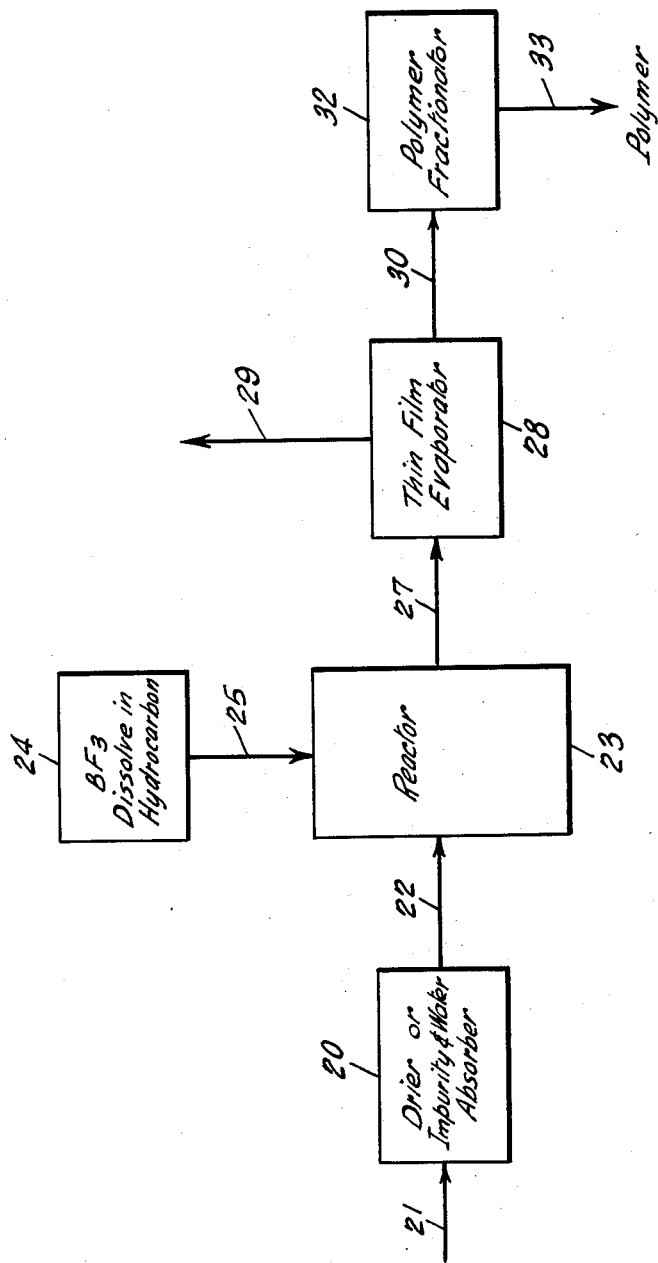

3,125,612
Patented Mar. 17, 1964

3,125,612
METHOD FOR THE PRODUCTION OF POLYISOBUTYLENE
Edward T. Child and Marvin L. Rambo, Fishkill, and John T. Nolan, Jr., Wappingers Falls, N.Y., assignors to Texaco Inc., New York, N.Y., a corporation of Delaware
Filed Mar. 29, 1961, Ser. No. 99,088
7 Claims. (Cl. 260—683.15)

This invention relates to polyisobutylene and, more particularly, to an improved method for producing liquid polyisobutylene polymers in the 1000 to 1600 molecular weight range.

General methods for polymerizing olefins including isobutylene are well known. Thus, it is conventional to polymerize a $C_2$ to $C_4$ olefin in the presence of a catalyst and a diluent under suitable conditions of temperature and pressure to produce a wide range of olefin polymers. Among the catalysts that have been employed for this reaction are the Friedel-Crafts catalysts including aluminum trichloride, titanium tetrachloride and boron trifluoride.

While processes of the foregoing type have been employed commercially, nevertheless, they are not as economical as desirable to encourage the broadest possible market utilization of the polyisobutylene polymers. For example, high conversion rates are often achieved but only at the expense of a lower molecular weight of the polymer product. Additionally, the amount of catalyst consumed per unit weight of the polymer product is often inordinately high thereby defeating efforts to reduce costs and improve the competitiveness of the processes.

An improved method has now been discovered which overcomes many of the drawbacks of the prior art processes. By this process, liquid polyisobutylene polymers are produced at high conversion rates. Of even greater importance is the fact that an unsually high degree of catalyst utilization has been achieved thereby providing a uniquely economical process for the production of polyisobutylene polymers.

According to this invention, monomer isobutylene in admixture with a paraffinic hydrocarbon is polymerized in the presence of boron trifluoride catlayst. More particularly, an isobutylene mixture consisting of 50 to 65% by weight of isobutylene is polymerized in the presence of 0.025 to 0.04% by weight of boron trifluoride at a temperature in the range of $-5°$ to $-10°$ F. for a residence time in the range of 45 to 55 minutes.

The foregoing limits are essential and critical both for the realization of a high conversion rate of isobutylene to polymer in the desired molecular weight range and for the realization of a high polymer to catalyst yield in relation to the amount of catlayst consumed. Criticality is evidenced by the discovery that a moderate increase in the amount of catalyst employed while producing a slightly higher conversion rate at the same time sharply reduced the molecular weight of the polymer and cut the efficiency or utilization of the catalyst based on the weight of polymer produced per unit weight of catalyst by more than 50%. Similarly, when feed streams were employed consisting of less than 50% of isobutylene monomer, the catalyst efficiency was again dropped to substantially less than 50% of that realized under the critical conditions. It is essential that the feed mixture of isobutylene and a hydrocarbon consist of 50 to 65% by weight of isobutylene with the preferred proportion of isobutylene being about 56%. Amounts of isobutylene in the feed mixture above the specified limits substantially reduce the degree of catlayst utilization.

The amount of catalyst employed in this reaction is likewise critical if the desired high yields are to be realized. Thus, a high degree of catalyst utilization has been observed when the amount of boron trifluoride employed is in the range of 0.025 to 0.04% by weight based on the weight of the feed mixture, the optimum amount of catalyst being about 0.03% by weight. Both higher and lower amounts of catalyst give only a fraction of the catalyst utilization that is realized by conducting this process within the essential operating conditions.

The temperature at which this process is conducted is also critical. Ordinarily, an increasingly lower temperature for a polymerization reaction of this type produces a polymer of higher molecular weight. In the instant process, a temperature in the range of $-5°$ to $-10°$ F. was found to be essential for the production of polymers in the 1000 to 1600 number average molecular weight range while at the same time effecting high catalyst utilization. Temperatures both above and below the prescribed range were employed in similar polymerization reactions but the molecular weight of the polymer was moderately to substantially lower and the catalyst utilization drastically reduced.

A residence time of 45 to 55 minutes for this reaction is an additional critical feature. This residence time must be sufficiently long to permit a high degree of catalyst utilization but at the same time the polymerization period must not be excessively long that undesirable reactions occur. The reaction may be stopped at any time within the specified period. The optimum time for stopping the reaction within the residence period can be determined by taking a sample of the reaction mixture and chemically testing it to ascertain whether or not substantially all of the monomer has reacted.

The accompanying drawing, FIGURE 1, illustrates one mode of the practice of this invention. This is a flow diagram illustrating the sequence of steps for this process.

Referring now to FIGURE 1, an isobutylene feed stream such as a butane-butene stream or a synthetic isobutylene-solvent stream in which the solvent is a saturated $C_4$ to $C_8$ hydrocarbon, such as butane, isobutane, n-pentane and the like, consisting of 50 to 65% by weight of isobutylene is passed into drier 20 via line 21. The dried feed stream is then introduced into reactor 23 via line 22. Simultaneously, a mixture of boron trifluoride catalyst and a hydrocarbon in reservoir 24 is passed into reactor 23 through line 25.

Reactor 23 is any vessel wherein the isobutylene and the boron trifluoride catalyst mixture are intimately admixed under suitable reaction conditions. The reactor is maintained under a moderate pressure generally in the range of 30 to 150 p.s.i.g. with the preferred operating pressure being about 85 p.s.i.g. The reactor is maintained at a temperature in the range of $-5°$ to $-10°$ F. A residence time of 45 to 55 minutes is required for the completion of the reaction.

Highly efficient polymerization reactions have been realized at specific catalyst and total feed rates. Thus, a catalyst feed rate of 0.0025 to 0.0030 lb. of $BF_3$/hr. with a total feed rate in the range of 10.5 to 11 lb./hr. produced polymers in the intended molecular weight range while realizing a high level of catalyst utilization.

After the reaction is complete, the reaction product is passed from the reactor through line 27 into thin film evaporator 28. In the thin film evaporator, the catalyst, solvent and unreacted olefin are removed from the reaction product. Because of the high conversion rate and the small amount of catalyst employed in this reaction, none of the materials removed by the thin film evaporator need to be recycled in the process. The polymer product is passed into fractionator 32 via line 30 for the separation and recovery of the polymer product.

The following example illustrates the practice of this invention.

EXAMPLE

A series of runs were conducted employing feed mixtures consisting of isobutylene and n-pentane. The isobutylene was polymerized in contact with a mixture of boron trifluoride in n-pentane. The reaction conditions and results are given in Table I, below.

*Table I*

POLYMERIZATION OF ISOBUTYLENE WITH BORON TRIFLUORIDE USING n-PENTANE AS THE SOLVENT FOR THE FEED AND FOR THE CATALYST

|  | Runs | | | |
| --- | --- | --- | --- | --- |
|  | A | B | C | D |
| Conversion | 91 | 12 | 94 | 91 |
| Molecular Weight | 992 | 1190 | 901 | 1240 |
| Percent Isobutylene (basis total feed) | 33.8 | 36.8 | 49.7 | 55.7 |
| Percent Catalyst (basis total feed) | 0.03 | 0.013 | 0.05 | 0.03 |
| Temperature, °F | −15 | −25 | −1 | −7 |
| Catalyst Feed Rate, lb. BF$_3$/hr | 0.0027 | 0.0010 | 0.0060 | 0.0027 |
| Total Feed Rate, Actual, lb./hr | 8.5 | 7.8 | 12.1 | 10.8 |
| Average Residence Time, min | 63 | 68 | 44 | 49 |
| Lb. polymer/lb. catalyst | 960 | 340 | 940 | 2030 |

Run D was conducted under the conditions of this process. It is readily apparent that a reaction conducted under the critical conditions of this process results in over 90% conversion of monomer, high average molecular weight liquid polymer and a surprisingly high yield of polymer product per unit weight of catalyst consumed.

We claim:

1. A method for producing polyisobutylene having a number average molecular weight in the range of 1000 to 1600 which comprises forming a feed mixture of isobutylene and a hydrocarbon, said mixture consisting of 50 to 65% by weight of said isobutylene, and polymerizing said mixture in the presence of 0.025 to 0.04% by weight of boron trifluoride based on said mixture at a temperature in the range of −5° to −10° F. for a residence time of 45 to 55 minutes.

2. A method according to claim 1 in which said mixture consists of about 56% by weight of isobutylene.

3. A method according to claim 1 in which said boron trifluoride amounts to about 0.03% by weight based on said feed mixture.

4. A method for producing polyisobutylene having a number average molecular weight in the range of 1000 to 1600 which comprises forming a feed mixture of isobutylene and n-pentane, said mixture consisting of 50 to 65% by weight of said isobutylene, and polymerizing said mixture in the presence of 0.025 to 0.04% by weight of boron trifluoride based on said mixture at a temperature in the range of −5° to −10° F. for a residence time in the range of 45 to 55 minutes.

5. A method according to claim 4 in which said mixture consists of about 56% by weight of isobutylene.

6. A method according to claim 4 in which said boron trifluoride amounts to about 0.03% by weight based on said feed mixture.

7. A method for producing polyisobutylene having a molecular weight in the range of 1000 to 1600 which comprises forming a feed mixture of isobutylene and n-pentane, said mixture consisting of about 56% of said isobutylene, and polymerizing said mixture in the presence of about 0.03% by weight of boron trifluoride based on said mixture at a temperature of about −7° F. and a residence time in the range of 45 to 55 minutes.

References Cited in the file of this patent

UNITED STATES PATENTS

| 2,360,632 | Mann et al. | Oct. 17, 1944 |
| 2,588,425 | Stevens et al. | Mar. 11, 1952 |
| 2,657,246 | Schneider et al. | Oct. 27, 1953 |
| 2,918,508 | Coopersmith et al. | Dec. 22, 1959 |

FOREIGN PATENTS

| 473,324 | Canada | May 1, 1951 |